(12) United States Patent
Sato

(10) Patent No.: US 9,981,630 B2
(45) Date of Patent: May 29, 2018

(54) WEBBING TAKE-UP DEVICE

(71) Applicant: KABUSHIKI KAISHA TOKAI-RIKA-DENKI-SEISAKUSHO, Aichi-ken (JP)

(72) Inventor: Shinji Sato, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 212 days.

(21) Appl. No.: 15/016,522

(22) Filed: Feb. 5, 2016

(65) Prior Publication Data
US 2016/0236647 A1  Aug. 18, 2016

(30) Foreign Application Priority Data

Feb. 12, 2015 (JP) .................................. 2015-025484

(51) Int. Cl.
*B60R 22/405* (2006.01)
(52) U.S. Cl.
CPC .................................. *B60R 22/405* (2013.01)
(58) Field of Classification Search
CPC .................................................. B60R 22/405
See application file for complete search history.

(56) References Cited

U.S. PATENT DOCUMENTS

| | | | | |
|---|---|---|---|---|
| 2007/0290091 A1* | 12/2007 | Mori | ..................... | B60R 22/405 242/383.1 |
| 2009/0218432 A1* | 9/2009 | Aihara | .................... | B60R 22/41 242/396.2 |
| 2011/0290929 A1* | 12/2011 | Tatsuma | .................. | B60R 22/38 242/383.2 |

FOREIGN PATENT DOCUMENTS

JP         2008-24284       2/2008

* cited by examiner

*Primary Examiner* — Sang K Kim
(74) *Attorney, Agent, or Firm* — Thomas W. Cole; Roberts Mlotkowski Safran Cole & Calderon, P.C.

(57) ABSTRACT

A webbing take-up device includes a spool capable of taking-up webbing worn by an occupant, a V-gear capable of rotating accompanying rotation of the spool, a lock pawl that is operated to restrict rotation of the spool in a pull-out direction, and a W-pawl provided at the V-gear, that is displaced and causes the lock pawl to operate when the V-gear is rotated in the pull-out direction at a specific speed or greater. The webbing take-up device also includes a restricting body that is moved to a permitting position permitting displacement of the W-pawl when the V-gear is rotated in the pull-out direction, and that is moved to a restricting position enabling the W-pawl to abut when the V-gear is rotated in a take-up direction, restricting displacement of the W-pawl due to the W-pawl abutting, a contact angle with the W-pawl being set with 90 degrees or greater.

3 Claims, 6 Drawing Sheets

WEBBING TAKE-UP DEVICE

CROSS-REFERENCE TO RELATED APPLICATION

This application claims priority under 35 USC 119 from Japanese Patent Application No. 2015-025484 filed Feb. 12, 2015, the disclosure of which is incorporated by reference herein.

BACKGROUND

Field of the Invention

The present invention relates to a webbing take-up device that takes up webbing worn by an occupant.

Related Art

In a webbing take-up device described in Japanese Patent Application Laid-Open (JP-A) No. 2008-24284, when a spool and a V gear are suddenly rotated in a pull-out direction, inertial mass of the V gear is swung, so that a lock pawl is operated, and the spool is restricted from rotating in the pull-out direction.

One end of a friction spring is supported by the V gear so as to be capable of rotating, and a lever and a cover are attached to the friction spring. When the spool and the V gear are rotated, the cover generates friction force, and the friction spring, the lever, and the cover are rotated.

When the spool and the V gear are rotated in the pull-out direction, the lever is rotated to a non-abutting position, and swinging of the inertial mass is permitted. When the spool and the V gear are rotated in a take-up direction, the lever is rotated to an abutting position, and the inertial mass abuts the lever, so that swinging of the inertial mass is restricted.

In configuration in which swinging of the inertial mass is restricted by the inertial mass (operating member) abutting the lever (restricting body), it is important that input of excessive load from the inertial mass to the lever is suppressed.

SUMMARY

In consideration of the above circumstances, a webbing take-up device is obtained that is capable of suppressing input of excessive load from an operating member to a restricting body.

A webbing take-up device of a first aspect includes: a take-up shaft that is capable of taking up a webbing worn by an occupant, that is rotated in a take-up direction to take up the webbing, and that is rotated in a pull-out direction due to the webbing being pulled out; a rotating body that is capable of rotating accompanying rotation of the take-up shaft; a restricting member that restricts rotation of the take-up shaft in the pull-out direction by the restricting member being caused to be operated; an operating member that is provided at the rotating body and that is displaced to cause the restricting member to operate when the rotating body is rotated in the pull-out direction at a specific speed or greater; and a restricting body that is moved to a permitting position permitting displacement of the operating member when the rotating body is rotated in the pull-out direction, and that is moved to a restricting position enabling the operating member to abut the restricting body when the rotating body is rotated in the take-up direction, the restricting body restricting displacement of the operating member due to the operating member abutting the restricting body, wherein a contact angle of the restricting body and the operating member is set to be 90 degrees or greater.

A webbing take-up device of a second aspect is the webbing take-up device of the first aspect, wherein a rigidity of the operating member at a location which is at a restricting body side is set lower than a rigidity of the operating member at a location which is further away from the restricting body than the location which is at the restricting body side of the operating member.

A webbing take-up device of a third aspect is the webbing take-up device of the first aspect or the second aspect, wherein restriction of the displacement of the operating member by the restricting body is released by the operating member and the restricting body making contact sliding; and at least a part of a face of the operating member, which makes contact sliding with the restricting body, is curved with a smaller radius than a radius of a face of the restricting body, which makes contact sliding with the operating member.

In the webbing take-up device of the first aspect, the webbing is taken up by rotating the take-up shaft in the take-up direction, and the take-up shaft is rotated in the pull-out direction by pulling out the webbing. The rotating body is capable of rotating accompanying rotation of the take-up shaft. The operating member is displaced (moved) and causes the restricting member to operate, restricting rotation of the take-up shaft in the pull-out direction when the rotating body has been rotated in the pull-out direction at a specific speed, or greater.

When the rotating body is rotated in the pull-out direction, the restricting body is moved to the permitting position. Displacing of the operating member is thereby permitted. When the rotating body is rotated in the take-up direction, the restricting body is moved to the restricting position, due thereto, the operating member is capable of abutting, and displacement of the operating member is restricted due to the operating member being abutted by the restricting body. Namely, rotation of the take-up shaft in the pull-out direction is not restricted due to the operating member not causing the restricting member to operate.

Note that in the aspect, the contact angle of the restricting body and the operating member is set at 90°, or greater. Thus, when the operating member abuts and presses the restricting body, the operating member and the restricting body easily make contact sliding at contact faces thereof. In other words, when the operating member has pressed the restricting body with a high load, the restricting body can be moved in a direction to escape from the operating member. This enables input of excessive load from the operating member to the restricting body to be suppressed.

In the webbing take-up device of the second aspect, the location of the operating member at the restricting body side is set with a lower rigidity, thereby enabling the location of the operating member at the restricting body side to made to easily flex when the operating member has pressed the restricting body. This further enables the restricting body to escape from the operating member when the operating member has pressed the restricting body.

In the webbing take-up device of the third aspect, the operating member and the restricting body make contact sliding after abutting each other, such that restricting by the restricting body to displacement of the operating member is released. Note that in the aspect, at least a portion of a face of the operating member that makes contact sliding with the restricting body is curved with a smaller radius than the radius of a face of the restricting body that makes contact sliding with the operating member. This enables friction force between the face of the operating member that curves as described above, and the face of the restricting body that makes contact sliding with the operating member, to be reduced. This further enables the restricting body to escape from the operating member when the operating member has pressed the restricting body.

BRIEF DESCRIPTION OF THE DRAWINGS

Embodiments of the invention will be described in detail with reference to the following figures, wherein.

DETAILED DESCRIPTION

Figure 1:
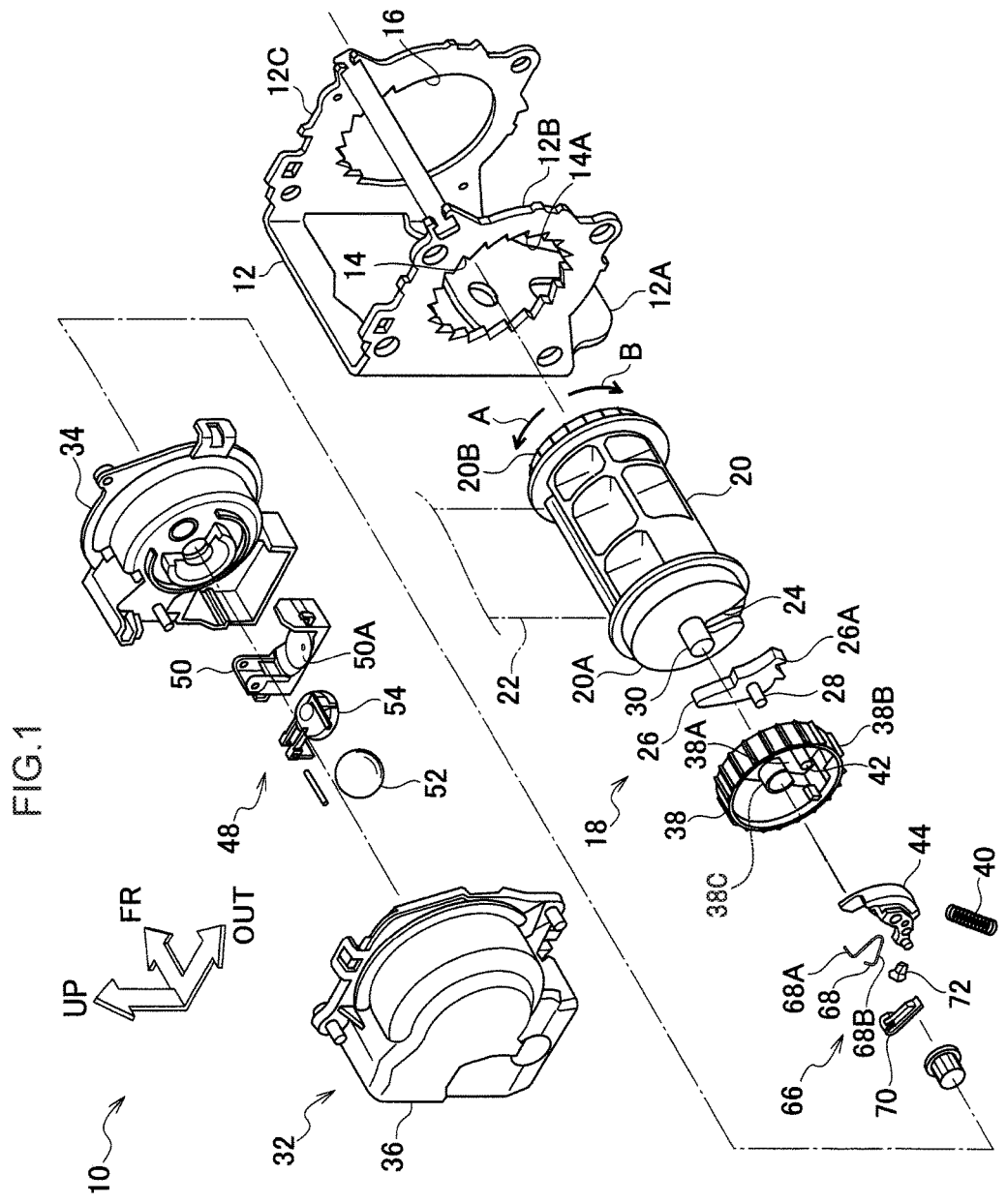
FIG. 1 is an exploded perspective view illustrating a webbing take-up device.

FIG. 1 is an exploded perspective view illustrating a webbing take-up device 10 according to an exemplary embodiment, viewed in a diagonal direction from the rear side, outside and upper side. Note that in the drawings, the arrow FR indicates the vehicle front side, the arrow OUT indicates the vehicle width direction outside, and the arrow UP indicates the vehicle upper side, in a state in which the webbing take-up device 10 is attached to a vehicle. In the below explanation, simple reference to the front-rear and up-down directions refers to front-rear in the vehicle front-rear direction, and up-down in the vehicle up-down direction.

As illustrated in FIG. 1, the webbing take-up device 10 of the present exemplary embodiment includes a frame 12 formed in a substantially U-shape viewed from the vehicle upper side. The frame 12 includes a back plate 12A extending along the vehicle up-down direction with its thickness direction along the vehicle width direction, and an lag plate 12B and an lag plate 12C, which respectively extend from vehicle front-rear direction both end portions of the back plate 12A toward the vehicle width direction outside so as to bend from the back plate 12A, and are disposed facing each other. The back plate 12A of the frame 12 is fixed to a vehicle body, such that the webbing take-up device 10 is installed to the vehicle body.

A placement hole 14 and a placement hole 16, which are substantially circular shaped, are respectively formed at the lag plate 12B and the lag plate 12C. The placement hole 14 and the placement hole 16 face each other along the vehicle front-rear direction. Ratchet teeth 14A (inner teeth), configuring a lock mechanism 18 serving as a restricting section, are formed around the entire outer circumference of the placement hole 14.

A substantially circular column shaped spool 20, serving as a take-up shaft, is provided between the lag plate 12B and the lag plate 12C of the frame 12. One end 20A at the rear side (lag plate 12B side) of the spool 20 is disposed inside the placement hole 14 of the lag plate 12B, and another end 20B at the front side (lag plate 12C side) of the spool 20 is disposed inside the placement hole 16 of the lag plate 12C. The spool 20 is thereby capable of rotating in the circumferential direction in a state with its axial direction parallel to the front-rear direction. Note that, unless specifically stated otherwise, simple reference below to the axial direction, radial direction, and circumferential direction refers to the axial direction, radial direction, and circumferential direction of the spool 20.

A base end side of elongated belt shaped webbing 22 (belt) is anchored to the spool 20, and the webbing 22 is taken up onto the spool 20 from its base end side. The webbing 22 is taken up onto the spool 20 when the spool 20 is rotated in a take-up direction (the arrow A direction in FIG. 1, this being one circumferential direction). The spool 20 is rotated in a pull-out direction (the arrow B direction in FIG. 1, this being another circumferential direction), when the webbing 22 is pulled out from the spool 20. The webbing 22 extends out toward the upper side from the frame 12, and the webbing 22 is worn by an occupant seated in a vehicle seat, not illustrated in the drawings.

A flat spiral spring (power spring) (not illustrated in the drawings), serving as a take-up urging (energizing) member, is coupled to the another end 20B of the spool 20, and the flat spiral spring is disposed at the front side of the frame 12 (the front side of the lag plate 12C). The flat spiral spring urges (energizes) the spool 20 in the take-up direction, such that urging (energizing) force in the take-up direction of the spool 20 acts on the webbing 22. Thus, when the webbing 22 is worn by the occupant, slack of the webbing 22 is eliminated by the urging force of the flat spiral spring, and when the webbing 22 has been released from being worn by the occupant, the webbing 22 is taken up onto the spool 20 due to the urging force of the flat spiral spring.

A housing hole 24 open toward the radial direction outside of the spool 20 is formed in the one end 20A of the spool 20. An elongated plate shaped lock pawl 26, serving as a restricting member configuring the lock mechanism 18, is housed inside the housing hole 24 so as to be capable of moving. A lock tooth 26A is formed at one end of the lock pawl 26. A circular column shaped operating shaft 28 is integrally provided at the lock pawl 26, and the operating shaft 28 projects out toward the rear side from the lock pawl 26.

A circular column shaped rotation shaft 30 is integrally provided at an axial center portion of the one end 20A of the spool 20. The rotation shaft 30 projects out from the spool 20 toward the rear side, and is disposed coaxially to the spool 20.

A sensor mechanism 32, configuring the lock mechanism 18, is provided at the rear side of the frame 12 (the rear side of the lag plate 12B).

The sensor mechanism 32 includes a bottomed, substantially circular tube shaped sensor holder 34 that is formed using a resin material and is open toward the front side (the lag plate 12B side). The sensor holder 34 is fixed to the lag plate 12B. A bottom surface inside the sensor holder 34 configures a planar face shaped friction face 34A (see FIG. 4), and the friction face 34A is disposed perpendicularly to the axial direction of the spool 20.

A bottomed, substantially circular tube shaped sensor cover 36, formed using a resin material and open toward the front side, is provided at the rear side of the sensor holder 34 (the opposite side to the lag plate 12B side). The sensor cover 36 is fixed to the lag plate 12B in a state with the sensor holder 34 housed inside.

A V gear 38, serving as a rotating body, is provided inside the sensor holder 34. The V gear 38 is formed using a resin material, and is formed in a bottomed, circular tube shape and open toward the rear side. A tube-shaped portion 38C, formed in a tube shape, is provided so as to protrude out at an axial center portion of a bottom wall 38A of the V gear 38. The V gear 38 is capable of rotating relative to the spool 20 due to the rotation shaft 30 of the spool 20 being inserted into the tube-shaped portion 38C.

An elongated operating groove, not illustrated in the drawings, is formed in the bottom wall 38A of the V gear 38. The operating shaft 28 of the lock pawl 26 is inserted into the operating groove. A compression coil spring 40 is interposed between the V gear 38 and the one end 20A of the spool 20. The compression coil spring 40 urges the V gear 38 in the pull-out direction relative to the spool 20 (urges the spool 20 in the take-up direction relative to the V gear 38), and causes the operating shaft 28 to abut one longitudinal direction end of the operating groove. Rotation of the V gear 38 in the pull-out direction relative to the spool 20 due to the urging force of the compression coil spring 40 is thereby stopped, and the V gear 38 is capable of rotating about the rotation shaft 30 of the spool 20 accompanying rotation of the spool 20. Ratchet teeth 38B (outer teeth) are formed about the entire outer circumference of the V gear 38.

A circular column shaped swing shaft 42 is provided so as to protrude out from the bottom wall 38A of the V gear 38. The swing shaft 42 is disposed at the radial direction outside of the center axis line of the V gear 38. The center axis line of the swing shaft 42 and the center axis line of the V gear 38 are parallel to each other.

Figure 2:
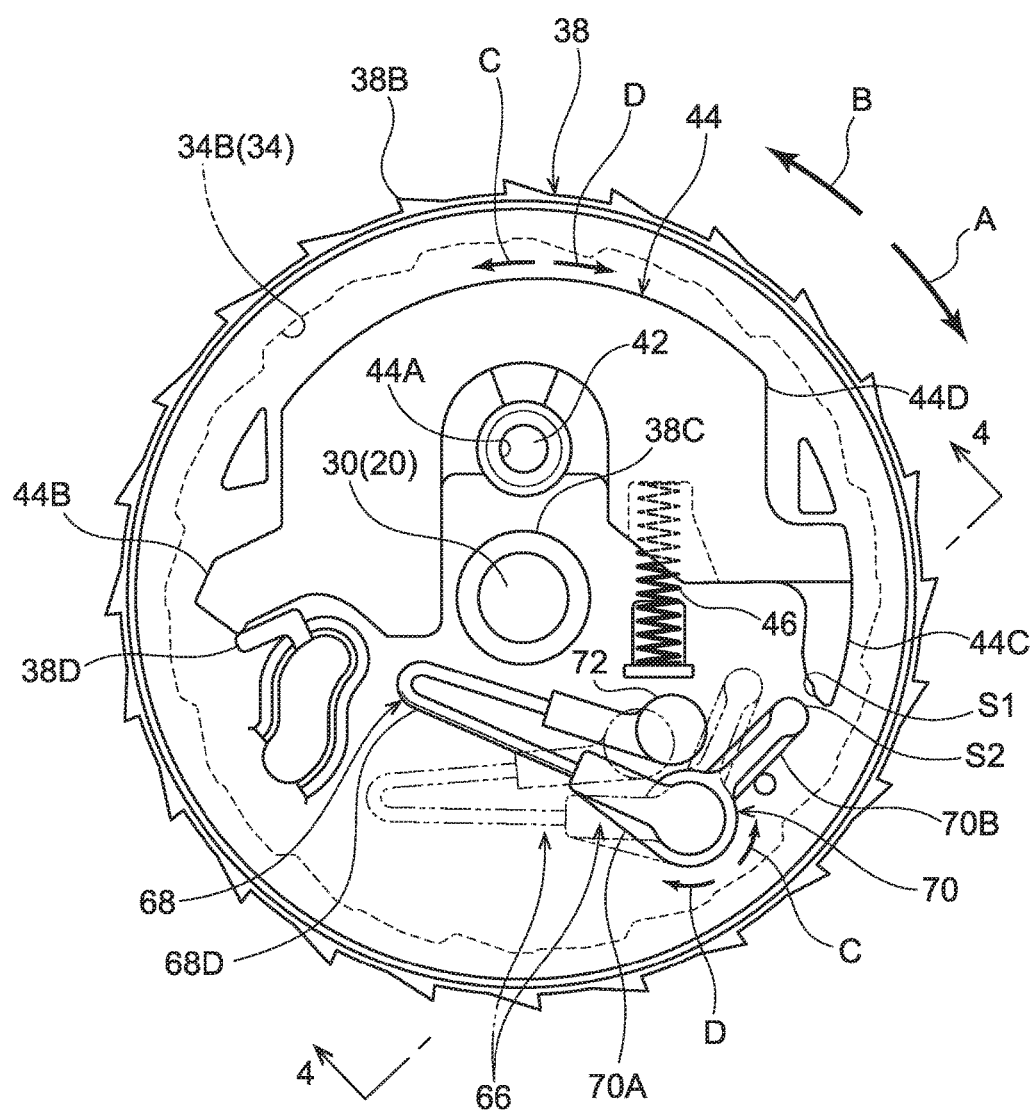
FIG. 2 is a face-on view illustrating relevant portions of a webbing take-up device.

As illustrated in FIG. 2, a W pawl 44, serving as an operating member, is supported by the swing shaft 42 so as to be capable of being swung (displaced). To explain specifically, the W pawl 44 is formed in a substantially U-shape so as to open at the V gear 38 axial center portion side in face-on view, and a swing shaft insertion hole 44A, through which the swing shaft 42 is inserted, is formed in a circumferential direction (the circumferential direction of the V gear 38) intermediate portion of the W pawl 44. Another circumferential direction side end portion of the W pawl 44 configures an engagement portion 44B that engages with an engaged portion 34B of the sensor holder 34. One circumferential direction side end portion of the W pawl 44 configures an abutting portion 44C that extends toward a restricting cover 70 side of a restricting body 66, described later. The abutting portion 44C is formed so as to gradually become narrower on progression toward the one circumferential direction side, and one circumferential direction side end face of the abutting portion 44C configures an abutting face S1 that abuts the restricting cover 70. In the present exemplary embodiment, the thickness of the abutting portion 44C in the axial direction is set thinner than the thickness of a circumferential direction intermediate portion 44D of the W pawl 44 in the axial direction. The rigidity of the abutting portion 44C is thereby lower than the rigidity of the circumferential direction intermediate portion 44D of the W pawl 44.

A return spring 46 is interposed between the W pawl 44 and the V gear 38, and the return spring 46 urges the W pawl 44 in a recovery direction (the arrow C direction). Swinging of the W pawl 44 in the recovery direction by the urging force of the return spring 46 is stopped by a restriction protruding portion 38D provided at the V gear 38.

When the V gear 38 is rotated in the pull-out direction, force due to inertia acts on the W pawl 44 toward the take-up direction with respect to the V gear 38. The W pawl 44 thereby attempts to swing in an operating direction (the arrow D direction) with respect to the V gear 38. When the V gear 38 has been suddenly rotated in the pull-out direction, force due to inertia acting on the W pawl 44 exceeds the urging force of the return spring 46. The W pawl 44 is thereby swung in the operating direction with respect to the V gear 38, and the engagement portion 44B of the W pawl 44 engages with the engaged portion 34B of the sensor holder 34, such that rotation of the V gear 38 in the pull-out direction is stopped.

As illustrated in FIG. 1, an acceleration sensor 48 is provided at a lower end portion of the sensor holder 34. The acceleration sensor 48 includes a substantially U-shaped housing 50 open toward the upper side as viewed vehicle face-on, and a recess shaped curved face 50A is formed at an upper face of a bottom wall of the housing 50. A spherical shaped ball 52 is placed on the curved face 50A, and a substantially plate shaped lever 54 is placed at the upper side of the ball 52. A base end of the lever 54 is supported by a side wall of the housing 50 so as to be capable of rotating, and the V gear 38 is disposed at the upper side of a leading end of the lever 54. The lever 54 is rotated toward the upper side due to the ball 52 rolling over the curved face 50A of the housing 50 and rising. The leading end of the lever 54 is thereby meshed with the ratchet teeth 38B of the V gear 38, so as to stop rotation of the V gear 38 in the pull-out direction.

When the spool 20 is rotated, against the urging force of the compression coil spring 40, in the pull-out direction relative to the V gear 38 at a time when rotation of the V gear 38 in the pull-out direction is stopped, as described above, the operating shaft 28 of the lock pawl 26 is moved to another length direction end side of the operating groove of the V gear 38, so that the lock pawl 26 is moved toward the radial direction outside of the spool 20 (one end 20A). The lock tooth 26A of the lock pawl 26 thereby meshes with the ratchet teeth 14A of the frame 12 (lag plate 12B), and rotation of the spool 20 in the pull-out direction is locked (restricted). The webbing 22 is thereby locked (restricted) from being pulled out from the spool 20.

Figure 4:
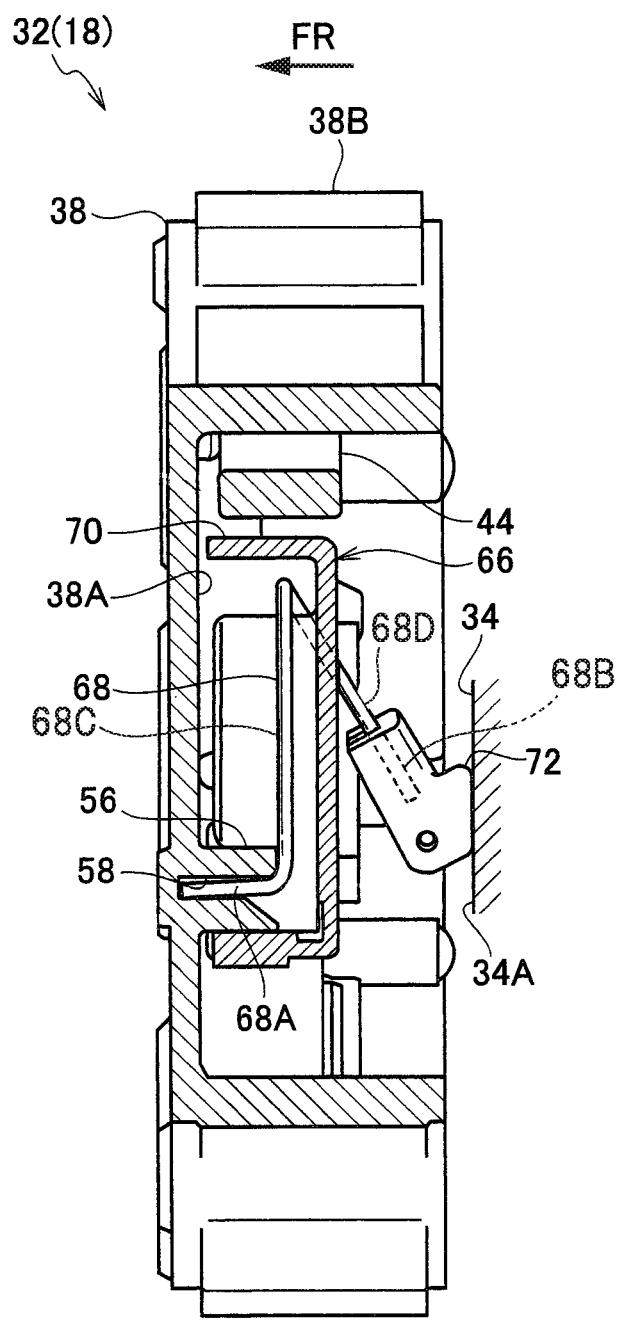
FIG. 4 is a cross-section illustrating main portions of the webbing take-up device sectioned along line 4-4 illustrated in FIG. 2.

As illustrated in FIG. 4, a support shaft 56 formed in a circular column shape is provided so as to protrude out from the bottom wall 38A of the V gear 38. The center axis line of the support shaft 56 and the center axis line of the V gear 38 are parallel to each other. A support hole 58 is formed in an axial center portion of the support shaft 56. The support hole 58 is open toward the rear side (the friction face 34A side of the sensor holder 34), and a front side thereof is closed off by the bottom wall 38A.

The restricting body 66 is supported by the support shaft 56 so as to be capable of rotating. As illustrated in FIG. 2, the restricting body 66 is configured including a friction spring 68, formed by bending an elongated rod shaped member, and the restricting cover 70 and a friction cover 72 that are attached to the friction spring 68.

As illustrated in FIG. 4, one end portion of the friction spring 68 configures an insertion portion 68A that is inserted into, and supported by, the support hole 58, and another end portion of the friction spring 68 configures a friction cover attachment portion 68B that the friction cover 72 is attached to. A location on the friction spring 68 between the insertion portion 68A and the friction cover attachment portion 68B, which is also a location at the insertion portion 68A side, configures a restriction cover attachment portion 68C that the restricting cover 70 (see FIG. 2) is attached to.

A location on the friction spring 68 between the insertion portion 68A and the friction cover attachment portion 68B, which is also a location of the friction cover attachment portion 68B side, configures a flex portion 68D. The flex portion 68D is flexed in a state in which the restricting body 66 is disposed between the friction face 34A side of the sensor holder 34 and the bottom wall 38A of the V gear 38. The friction cover 72 can press on the friction face 34A of the sensor holder 34 by the resilient force of the flex portion 68D. Thus, when the V gear 38 is rotated, the friction cover 72 slides over the friction face 34A, such that friction force is generated between the friction cover 72 and the friction face 34A.

As illustrated in FIG. 2, the restricting cover 70 is formed using a resin material, and is formed in a substantially L-shape in face-on view. The restricting cover 70 includes a rectangular block shaped attachment portion 70A that is attached to the restriction cover attachment portion 68C of the friction spring 68, and an abutted portion 70B that extends from one end portion of the attachment portion 70A toward the abutting portion 44C side of the W pawl 44. An end face of the abutted portion 70B configures an abutted face S2 that is abutted by the abutting portion 44C of the W pawl 44, and the abutted face S2 is curved in an arc shape in face-on view.

Figure 3:
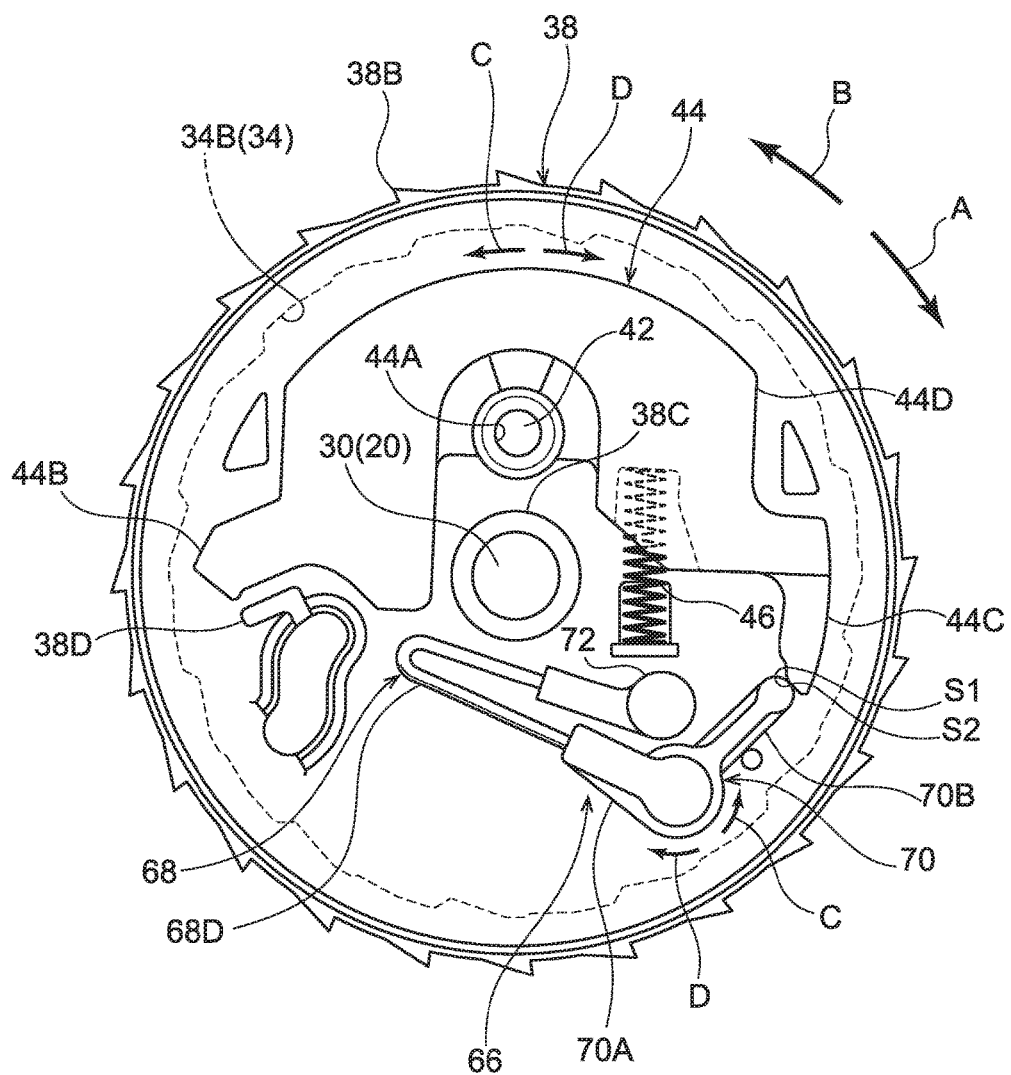
FIG. 3 is a face-on view corresponding to FIG. 2, illustrating relevant portions of a webbing take-up device in a state in which a W pawl has abutted a restricting cover.

When the V gear 38 is rotated in the take-up direction, the restricting body 66 is rotated toward one side (the arrow D direction side) about the support shaft 56 (see FIG. 4), and the restricting body 66 is rotated to a restricting position (the position illustrated by the solid lines in FIG. 2). Then, as illustrated in FIG. 3, the abutting portion 44C (the abutting face S1) of the W pawl 44 abuts the abutted portion 70B (the abutted face S2) of the restricting cover 70, such that the W pawl 44 is restricted from swinging to the operating direction relative to the V gear 38.

Figure 5:
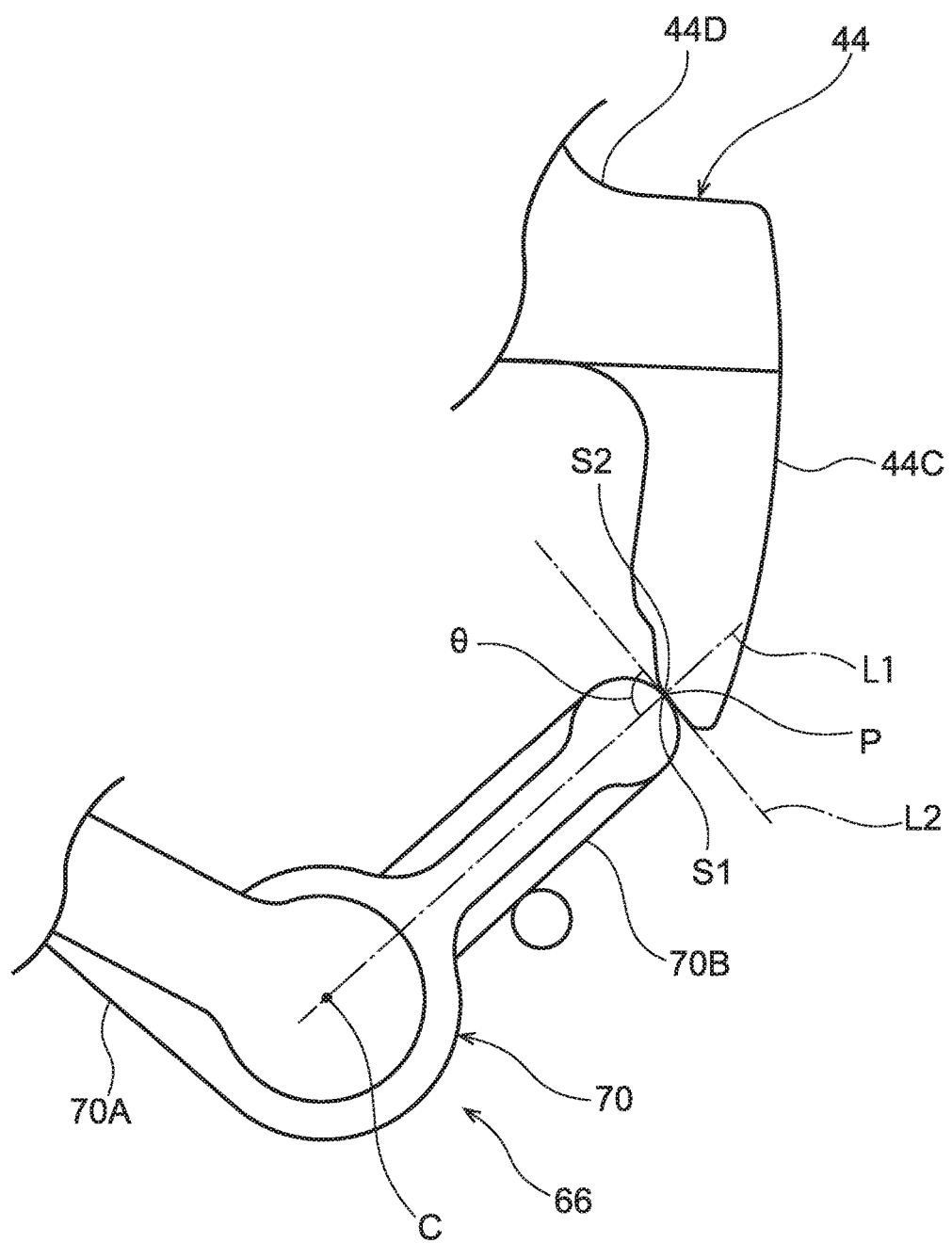
FIG. 5 is an enlarged face-on view illustrating an abut portion between a W pawl and a restricting cover.

Note that in the present exemplary embodiment, as illustrated in FIG. 5, the shapes of the abutting face S1 and the abutted face S2 are set such that a contact angle θ of both faces, at a contact point P, of the abutting portion 44C (abutting face S1) of the W pawl 44 and the abutted portion 70B (abutted face S2) of the restricting cover 70 is 90 degrees or greater.

Specifically, in FIG. 5 (as seen from the axial direction of the spool 20), in a state in which the abutting portion 44C (abutting face S1) of the W pawl 44 and the abutted portion 70B (abutted face S2) of the restricting cover 70 have been made to contact each other in a static state (in a state in which pressure is not occurring at the contact point of the both faces), the angle θ formed by a line L1 passing through a rotation center C of the restricting cover 70 and the contact point P (the line L1 extending from the rotation center C of the restricting cover 70 toward the contact point P), and a tangential line L2 of the abutting face S1 and the abutted face S2 at the contact point P (the tangential line L2 extending from the contact point P toward the inner side of the V gear 38) is set so as be from 90 degrees to 135 degrees. Thus, when the force with which the abutting portion 44C (abutting face S1) of the W pawl 44 presses the abutted portion 70B (abutted face S2) of the restricting cover 70 exceeds a specific value, the abutting portion 44C (abutting face S1) of the W pawl 44 and the abutted portion 70B (abutted face S2) of the restricting cover 70 make contact sliding, and the restricting body 66 rotates toward another side (the arrow C direction side) about the support shaft 56 (see FIG. 4). Namely, the restricting body 66 is rotated from the restricting position (the position illustrated by solid lines in FIG. 2) toward a permitting position (the position illustrated by imaginary lines in FIG. 2) side, described later.

Figure 6:
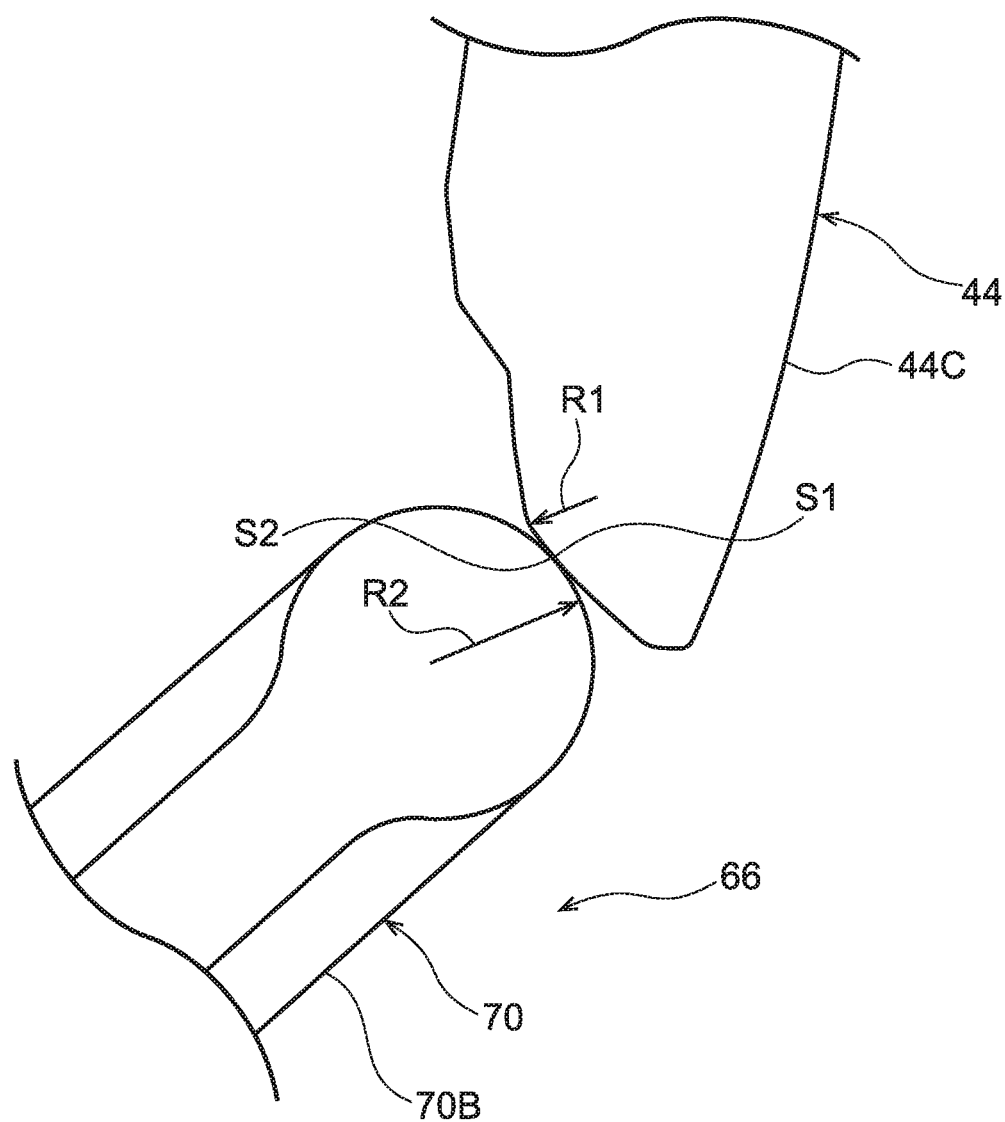
FIG. 6 is a further enlarged face-on view illustrating an abut portion between a W pawl and a restricting cover.

As illustrated in FIG. 6, a portion of the abutting face S1 of the W pawl 44 is curved with a radius of curvature R1 that is smaller than a radius of curvature R2 of the abutted face S2 of the restricting cover 70. The portion curved at the radius of curvature R1 is positioned at the radial direction inside with respect to the position where the abutting portion 44C (abutting face S1) of the W pawl 44 and the abutted portion 70B (abutted face S2) of the restricting cover 70 contact each other in the static state.

As illustrated in FIG. 2, when the V gear 38 is rotated in the pull-out direction, the restricting body 66 is rotated toward the another side (the arrow C direction side) about the support shaft 56 (see FIG. 4), and the restricting body 66 is rotated to the permitting position (the position illustrated by imaginary lines in FIG. 2). So, the abutting portion 44C (abutting face S1) of the W pawl 44 is in a state that does not abut the abutted portion 70B (abutted face S2) of the restricting cover 70 even if the W pawl 44 is swung, due thereto, the W pawl 44 is permitted to swing to the operating direction relative to the V gear 38.

Operation and Advantageous Effects of Present Exemplary Embodiment

Explanation follows regarding operation and advantageous effects of the present exemplary embodiment.

In the webbing take-up device 10 with the above configuration, the webbing 22 is pulled, and the spool 20 and the V gear 38 are rotated in the pull-out direction against the urging force of the flat spiral spring, so that the webbing 22 is pulled out from the spool 20 to be worn by an occupant.

When the vehicle has rapidly decelerated, the ball 52 rolls over the curved face 50A of the housing 50 in the acceleration sensor 48 and rises, such that the lever 54 is rotated toward the upper side, and the leading end thereof is meshed with the ratchet teeth 38B of the V gear 38. The V gear 38 is thereby stopped from rotating in the pull-out direction.

When the vehicle has rapidly decelerated further, the occupant moves under force due to inertia, such that the webbing 22 is pulled out from the spool 20 by the occupant, and the spool 20 and the V gear 38 are rapidly rotated in the pull-out direction.

When the V gear 38 is further rotated in the pull-out direction, the restricting body 66 is rotated by friction force occurring between the friction face 34A of the sensor holder 34 and the friction cover 72, and is rotated to the permitting position (the position illustrated by imaginary lines in FIG. 2). The W pawl 44 is thereby permitted to swing in the operating direction relative to the V gear 38.

Thus, when the V gear 38 has been rapidly rotated in the pull-out direction as described above, the W pawl 44 is swung in the operating direction relative to the V gear 38, the engagement portion 44B of the W pawl 44 engages with the engaged portion 34B of the sensor holder 34, and the V gear 38 is stopped from rotating in the pull-out direction.

When the V gear 38 is stopped from rotating in the pull-out direction, due to the spool 20 being rotated, against the urging force of the compression coil spring 40, in the pull-out direction relative to the V gear 38, the operating shaft 28 of the lock pawl 26 is moved to the length direction another end side of the operating groove of the V gear 38, and the lock pawl 26 is moved toward the radial direction outside of the spool 20. The lock tooth 26A of the lock pawl 26 is thereby meshed with the ratchet teeth 14A of the frame 12, and rotating of the spool 20 in the pull-out direction is locked. The webbing 22 being pulled out from the spool 20 is thereby locked, and the occupant is restrained by the webbing 22.

When the webbing 22 has been released from being worn by the occupant, the spool 20 and the V gear 38 are rotated in the take-up direction by the urging force of the flat spiral spring, and the webbing 22 is taken up onto the spool 20.

Note that, when the webbing 22 has finished being taken up onto the spool 20, there is a possibility that the spool 20 and the V gear 38 are rapidly rotated in the pull-out direction as a reaction to the rotation in the take-up direction being stopped.

Thus, when the V gear 38 is rotated in the take-up direction, the restricting body 66 is rotated by friction force occurring between the friction face 34A of the sensor holder 34 and the friction cover 72, and is moved to the restricting position (the position illustrated by solid lines in FIG. 2). Then, as illustrated in FIG. 3, the abutting portion 44C (abutting face S1) of the W pawl 44 abuts the abutted portion 70B (abutted face S2) of the restricting cover 70, so the W pawl 44 is restricted from swinging in the operating direction relative to the V gear 38.

Thus, since rotation of the V gear 38 in the pull-out direction is not stopped due to the engagement portion 44B of the W pawl 44 not engaging with the sensor holder 34, the lock pawl 26 is not moved toward the radial direction outside of the spool 20. Thus rotation of the spool 20 in the pull-out direction is not locked due to the lock tooth 26A of the lock pawl 26 not meshing with the ratchet teeth 14A of the frame 12. Namely, in the present exemplary embodiment, locking (what is referred to as an end locking) of the pulling out of the webbing 22 from the spool 20 can be prevented or suppressed, enabling the webbing 22 to be pulled out from the spool 20.

Note that in the present exemplary embodiment as previously described, the contact angle θ between both faces at the contact point of the abutting portion 44C (abutting face S1) of the W pawl 44 and the abutted portion 70B (abutted face S2) of the restricting cover 70 is set at 90°, or greater. Thus, when a high load is input from the abutting portion 44C of the W pawl 44 to the abutted portion 70B of the restricting cover 70, and the force which the abutting portion 44C (abutting face S1) of the W pawl 44 presses the abutted portion 70B (abutted face S2) of the restricting cover 70 exceeds the specific value, the abutting portion 44C (abutting face S1) of the W pawl 44 and the abutted portion 70B (abutted face S2) of the restricting cover 70 make contact sliding, and the restricting body 66 is rotated about the support shaft 56 (see FIG. 4) toward the another side (the arrow C direction side). Namely, the restricting body 66 is rotated from the restricting position (the position illustrated by solid lines in FIG. 2) toward the permitting position (the position illustrated by imaginary lines in FIG. 2) side. Thus the present exemplary embodiment enables the input of excessive load from the W pawl 44 to the restricting body 66 to be suppressed.

In the present exemplary embodiment, the thickness of the abutting portion 44C of the W pawl 44 in the axial direction is set thinner than the thickness of the circumferential direction intermediate portion 44D of the W pawl 44 in the axial direction, such that the rigidity of the abutting portion 44C of the W pawl 44 is lower than the rigidity of the circumferential direction intermediate portion 44D of the W pawl 44. Thus, when the abutting portion 44C (abutting face S1) of the W pawl 44 has pressed the abutted portion 70B (abutted face S2) of the restricting cover 70, the abutting portion 44C of the W pawl 44 can be made to easily flex toward the radial direction outside. When the abutting portion 44C of the W pawl 44 flexes toward the radial direction outside in this manner, the contact angle θ of both faces at the contact point between the abutting portion 44C (abutting face S1) of the W pawl 44 and the abutted portion 70B (abutted face S2) of the restricting cover 70 becomes further larger. Due thereto, the abutting portion 44C (abutting face S1) of the W pawl 44 and the abutted portion 70B (abutted face S2) of the restricting cover 70 make contact sliding more easily, enabling the input of excessive load from the W pawl 44 to the restricting body 66 to be suppressed even further.

Further, in the present exemplary embodiment, a portion of the abutting face S1 of the W pawl 44 is curved with the radius of curvature R1 that is smaller than the radius of curvature R2 of the abutted face S2 of the restricting cover 70. This enables friction force to be reduced between the portion that curves with the radius of curvature R1 at the abutting face S1 of the W pawl 44, and the abutted face S2 of the restricting cover 70. This enables the W pawl 44 to escape further from the restricting cover 70, thereby enabling input of excessive load from the W pawl 44 to the restricting body 66 to be further suppressed.

Note that in the present exemplary embodiment, an example has been explained in which a portion of the abutting face S1 of the W pawl 44 is curved with the radius of curvature R1 that is smaller than the radius of curvature R2 of the abutted face S2 of the restricting cover 70; however, the present invention is not restricted thereto. Whether or not a portion of, or all of, the abutting face S1 of the W pawl 44 is curved with the radius of curvature R1 that is smaller than the radius of curvature R2 of the abutted face S2 of the restricting cover 70 may be set as appropriate in consideration of a permitted value of force which the W pawl 44 presses the restricting cover 70, and the like.

In the present exemplary embodiment, an example has been explained in which the rigidity of the abutting portion 44C of the W pawl 44 is set lower than the rigidity of the circumferential direction intermediate portion 44D of the W pawl 44; however, the present invention is not restricted thereto. Whether or not the rigidity of the abutting portion 44C of the W pawl 44 is set lower than the rigidity of the circumferential direction intermediate portion 44D of the W pawl 44 may also be set as appropriate in consideration of a permitted value of force which the W pawl 44 presses the restricting cover 70, and the like.

An exemplary embodiment has been explained above; however, the present invention is not restricted thereto, and obviously various other modifications may be implemented within a range not departing from the spirit thereof.

What is claimed is:

1. A webbing take-up device comprising:
a take-up shaft that is capable of taking up a webbing worn by an occupant, that is rotated in a take-up direction to take up the webbing, and that is rotated in a pull-out direction due to the webbing being pulled out;
a rotating body that is capable of rotating accompanying rotation of the take-up shaft;
a restricting member that restricts rotation of the take-up shaft in the pull-out direction by the restricting member being caused to be operated;
an operating member that is provided at the rotating body and that is displaced to cause the restricting member to operate when the rotating body is rotated in the pull-out direction at a speed equal to or faster than a specific speed; and
a restricting body that is moved to a permitting position permitting displacement of the operating member when the rotating body is rotated in the pull-out direction, and that is moved to a restricting position enabling the operating member to abut the restricting body when the rotating body is rotated in the take-up direction, the restricting body restricting displacement of the operating member due to the operating member abutting the restricting body, wherein a contact angle of the restricting body and the operating member is set to be 90 degrees or greater, and wherein a rigidity of the operating member at a location which is at a restricting body side is set lower than a rigidity of the operating member at a location which is further away from the restricting body than the location which is at the restricting body side of the operating member.

2. The webbing take-up device of claim 1, wherein: restriction of the displacement of the operating member by the restricting body is released by the operating member and the restricting body making contact sliding; and at least a part of a face of the operating member, which makes contact sliding with the restricting body, is curved with a smaller radius than a radius of a face of the restricting body, which makes contact sliding with the operating member.

3. A webbing take-up device comprising:
- a take-up shaft that is capable of taking up a webbing worn by an occupant, that is rotated in a take-up direction to take up the webbing, and that is rotated in a pull-out direction due to the webbing being pulled out;
- a rotating body that is capable of rotating accompanying rotation of the take-up shaft;
- a restricting member that restricts rotation of the take-up shaft in the pull-out direction by the restricting member being caused to be operated;
- an operating member that is provided at the rotating body and that is displaced to cause the restricting member to operate when the rotating body is rotated in the pull-out direction at a specific speed or greater; and
- a restricting body that is moved to a permitting position permitting displacement of the operating member when the rotating body is rotated in the pull-out direction, and that is moved to a restricting position enabling the operating member to abut the restricting body when the rotating body is rotated in the take-up direction, the restricting body restricting displacement of the operating member due to the operating member abutting the restricting body, wherein a contact angle of the restricting body and the operating member is set to be 90 degrees or greater, wherein restriction of the displacement of the operating member by the restricting body is released by the operating member and the restricting body making contact sliding; and at least a part of a face of the operating member, which makes contact sliding with the restricting body, is curved with a smaller radius than a radius of a face of the restricting body, which makes contact sliding with the operating member, and wherein the operating member and the restricting body contact at a single point when the restricting body restricts displacement of the operating member.

* * * * *